(12) United States Patent
Shimizu et al.

(10) Patent No.: US 11,536,185 B2
(45) Date of Patent: Dec. 27, 2022

(54) CATALYST DEGRADATION DETERMINING DEVICE FOR STRADDLED VEHICLE AND STRADDLED VEHICLE INCLUDING SAME

(71) Applicant: YAMAHA HATSUDOKI KABUSHIKI KAISHA, Iwata (JP)

(72) Inventors: Yuta Shimizu, Shizuoka (JP); Ryo Tomii, Shizuoka (JP); Tatsuya Aoyama, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/590,536

(22) Filed: Feb. 1, 2022

(65) Prior Publication Data

US 2022/0251996 A1 Aug. 11, 2022

(30) Foreign Application Priority Data

Feb. 5, 2021 (JP) .............................. JP2021-017728

(51) Int. Cl.
   *F01N 11/00* (2006.01)
(52) U.S. Cl.
   CPC .......... *F01N 11/00* (2013.01); *F01N 2550/02* (2013.01); *F01N 2590/04* (2013.01); *F01N 2900/08* (2013.01)
(58) Field of Classification Search
   CPC combination set(s) only.
   See application file for complete search history.

(56) References Cited

U.S. PATENT DOCUMENTS

| | | | |
|---|---|---|---|
| 5,287,836 A * | 2/1994 | Shimasaki | F02M 26/61 123/406.2 |
| 2009/0173562 A1* | 7/2009 | Namari | F02D 11/105 180/179 |

(Continued)

FOREIGN PATENT DOCUMENTS

| | | |
|---|---|---|
| EP | 3276137 A1 | 1/2018 |
| EP | 3276138 A1 | 1/2018 |

(Continued)

OTHER PUBLICATIONS

Extended European Search Report in the counterpart European patent application No. 22154468.5 dated Jun. 20, 2022.

(Continued)

*Primary Examiner* — Binh Q Tran
(74) *Attorney, Agent, or Firm* — Rabin & Berdo, P.C.

(57) ABSTRACT

A catalyst degradation determining device for a straddled vehicle that includes an engine, a catalyst for cleaning an exhaust gas from the engine, and a throttle valve that is controllable by cruise control of the straddled vehicle to keep a traveling speed of the straddled vehicle constant. The catalyst degradation determining device includes a determiner that determines whether the cruise control is being executed, and an execution controller. The execution controller is configured to determine a degradation state of the catalyst while controlling an air-fuel mixture supplied through the throttle valve to the engine, in a case where the determiner determines that the cruise control is not being executed, and at least one running state of the straddled vehicle satisfies at least one predetermined allowable condition, and not to determine the degradation state of the catalyst in a case where the determiner determines that the cruise control is being executed.

3 Claims, 5 Drawing Sheets

(56) References Cited

U.S. PATENT DOCUMENTS

| | | | |
|---|---|---|---|
| 2012/0166068 A1* | 6/2012 | Kuratani | ............... F02D 41/149 |
| | | | 701/104 |
| 2017/0276103 A1* | 9/2017 | Yamamoto | .............. F02B 39/16 |
| 2018/0080364 A1 | 3/2018 | Yamashita et al. | |
| 2019/0193717 A1 | 6/2019 | Komuro et al. | |
| 2020/0080459 A1* | 3/2020 | Okamoto | ........... B01D 53/9454 |

FOREIGN PATENT DOCUMENTS

| | | | |
|---|---|---|---|
| EP | 3415731 A1 | 12/2018 | |
| JP | H08-144744 A | 6/1996 | |
| JP | H08-218851 A | 8/1996 | |
| JP | 2020-084839 A | 6/2020 | |
| WO | WO-2017159713 A1 * | 9/2017 | .............. B62M 7/02 |

OTHER PUBLICATIONS

Office Action in the counterpart Indian patent application No. 202224005794 dated Aug. 31, 2022.

* cited by examiner

CATALYST DEGRADATION DETERMINING DEVICE FOR STRADDLED VEHICLE AND STRADDLED VEHICLE INCLUDING SAME

CROSS-REFERENCE TO RELATED APPLICATIONS

This application is based upon and claims the benefit of priority of the prior Japanese Patent Application No. 2021-017728, filed on Feb. 5, 2021, the entire contents of which are incorporated herein by reference.

BACKGROUND

Technical Field

The present invention relates to a catalyst degradation determining device for a straddled vehicle and a straddled vehicle including the catalyst degradation determining device.

Description of Related Art

A catalyst for cleaning gas exhausted from an engine (exhaust gas) is provided in an exhaust system of a vehicle including an engine. Ability of a catalyst to clean an exhaust gas is degraded as the period of use becomes longer. As such, a catalyst degradation determining device that determines degradation of a catalyst is used to identify an appropriate replacement time for the catalyst.

Normally, feedback control is executed to bring the air-fuel ratio of an air-fuel mixture supplied to the engine close to a target air-fuel ratio. In the catalyst degradation determining device, with the feedback control for an air-fuel ratio executed, degradation of a catalyst is determined based on an oxygen concentration of an exhaust gas that has yet been cleaned by the catalyst and an oxygen concentration of an exhaust gas that has been cleaned by the catalyst, for example.

As one example of a catalyst degradation determining device for an automobile (Automobile Car), JP 8-218851 A describes a degradation diagnosis device in which an upstream $O_2$ sensor, a three-way catalyst and a downstream $O_2$ sensor are provided in this order in an exhaust system of an engine, for example.

In the degradation diagnosis device, with the feedback control for the air-fuel ratio of an air-fuel mixture executed, the ratio of an inversion frequency of output of the downstream $O_2$ sensor with respect to an inversion frequency of output of the upstream $O_2$ sensor is calculated as a ratio of inversion frequency. For example, in JP 8-218851 A, an inversion frequency is the number of times an output voltage of each $O_2$ crosses a predetermined threshold value (0.5 V, for example) in a predetermined period of time (10 seconds, for example). Degradation of a catalyst is determined based on a calculated ratio of inversion frequency.

As described above, in a case where degradation of a catalyst is determined based on an oxygen concentration of an exhaust gas that has yet been cleaned by the catalyst and an oxygen concentration of an exhaust gas that has been cleaned by the catalyst, when variations in change of the air-fuel ratio of an air-fuel mixture supplied to the engine are large, determination accuracy is degraded. Therefore, it is desirable that the air-fuel ratio of an air-fuel mixture supplied to the engine is kept such that variations in change in a certain period of time are small.

SUMMARY

Cruise control for keeping a vehicle speed constant at a preset speed has been known to assist a rider's operation during traveling of a vehicle. With the cruise control, variations in change of the air-fuel ratio of an air-fuel mixture supplied to the engine are small. Therefore, in the vehicle in which the cruise control is being executed, it is considered that degradation of a catalyst can be determined with high accuracy.

Control for forcibly oscillating an air-fuel ratio (hereinafter referred to as active air-fuel ratio control) in the feedback control of an air-fuel ratio during determination in regard to degradation of a catalyst in order to more sufficiently improve accuracy of determination in regard to degradation of a catalyst has been known (see JP 2020-084839 A.) Therefore, it is considered that degradation of a catalyst can be determined with higher accuracy in a case where the active air-fuel ratio control can be applied to a vehicle in which the cruise control is being executed.

On the other hand, a straddled vehicle such as a motorcycle works differently while traveling from the work of an automobile during traveling. Therefore, it is desired that determining work in regard to degradation of a catalyst is executed to suppress degradation of riding comfort while work of a straddled vehicle during traveling is taken into consideration.

An object of the present invention is to provide a catalyst degradation determining device for a straddled vehicle and a straddled vehicle including the catalyst degradation determining device that enable determining work in regard to degradation of a catalyst while suppressing degradation of riding comfort.

A power-to-weight ratio of a straddled vehicle such as a motorcycle is smaller than a power-to-weight ratio of an automobile. Thus, in regard to a straddled vehicle, a change in torque generated in an engine is more likely to influence work of the vehicle as compared to an automobile. For example, in a case where feedback control for forcibly changing an air-fuel ratio (hereinafter referred to as active air-fuel ratio control) by adjusting a fuel injection amount is executed, a traveling speed of a straddled vehicle changes subtly in response to a change of the air-fuel ratio.

During traveling of a straddled vehicle due to the cruise control, an opening of a throttle valve is adjusted such that a traveling speed is constant and at a predetermined speed. However, in a case where the cruise control and the active air-fuel ratio control are executed at the same time, it is difficult to cancel a change of a traveling speed of the straddled vehicle in response to a change of an air-fuel ratio by adjustment of an opening of the throttle valve. The reasons for this include that it is difficult to synchronize the control period of the cruise control with the control period of the active air-fuel ratio control, a response delay is generated from the time when an opening of the throttle valve is adjusted until a traveling speed changes, etc.

Thus, a rider of a straddled vehicle being in a cruise state due to the cruise control is highly likely to feel uncomfortable with respect to the work of the vehicle because of execution of the active air-fuel ratio control. In this manner, in the straddled vehicle, when the cruise control and the active air-fuel ratio control are executed at the same time, riding comfort may be markedly degraded. The inventors of the present invention paid attention to the above-mentioned points and have arrived at the present invention described below.

(1) A catalyst degradation determining device for a straddled vehicle according to one aspect of the present invention used in a straddled vehicle that has a catalyst for cleaning an exhaust gas from an engine and is configured to be capable of executing cruise control for keeping a traveling speed constant by control of a throttle valve includes a determiner that determines whether the cruise control is being executed, and an execution controller that is configured execute determining work for determining a degradation state of the catalyst while controlling an air-fuel mixture supplied to the engine in a case where it is determined by the determiner that the cruise control is not being executed and one or a plurality of running states of the straddled vehicle satisfy one or a plurality of predetermined allowable conditions, and execute the determining work in a case where it is determined by the determiner that the cruise control is being executed.

With the catalyst degradation determining device, in a case where the cruise control is being executed in the straddled vehicle, determining work in regard to a degradation state of a catalyst is not executed. Thus, with the cruise control executed, a torque of an engine does not change because of the control of an air-fuel mixture supplied to the engine. As a result, riding comfort in the straddled vehicle is prevented from being degraded during execution of the cruise control.

(2) The determiner may determine that execution of the cruise control has started based on an instruction for executing the cruise control, and may determine that execution of the cruise control has ended based on an instruction for ending the cruise control.

With the above-mentioned configuration, determination of the degradation state of a catalyst is reliably prevented when the cruise control is being executed.

(3) A straddled vehicle according to another aspect of the present invention includes an engine, an air-fuel mixture supplier that supplies an air-fuel mixture to the engine, a catalyst that cleans an exhaust gas from the engine, a cruise control executor that executes cruise control for keeping a traveling speed constant during traveling of the vehicle by controlling the air-fuel mixture supplier, and the above-mentioned catalyst degradation determining device.

The straddled vehicle includes the above-mentioned catalyst degradation determining device. Thus, when the cruise control is being executed, degradation of riding comfort in the straddled vehicle because of the control of an air-fuel mixture is prevented.

Other features, elements, characteristics, and advantages of the present disclosure will become more apparent from the following description of preferred embodiments of the present disclosure with reference to the attached drawings.

DETAILED DESCRIPTION

A catalyst degradation determining device for a straddled vehicle and a straddled vehicle including the catalyst degradation determining device according to one embodiment of the present invention will be described below with reference to the drawings. A motorcycle will be described as one example of the straddled vehicle.

The motorcycle described below has an engine and a three-way catalyst that cleans an exhaust gas from the engine and is configured to be capable of executing cruise control for keeping a traveling speed of the vehicle constant by control of a throttle valve. Keeping a traveling speed of the vehicle constant means keeping a traveling speed of the vehicle in a predetermined speed range (several km/h).

[1] Schematic Configuration of Motorcycle

Figure 1:
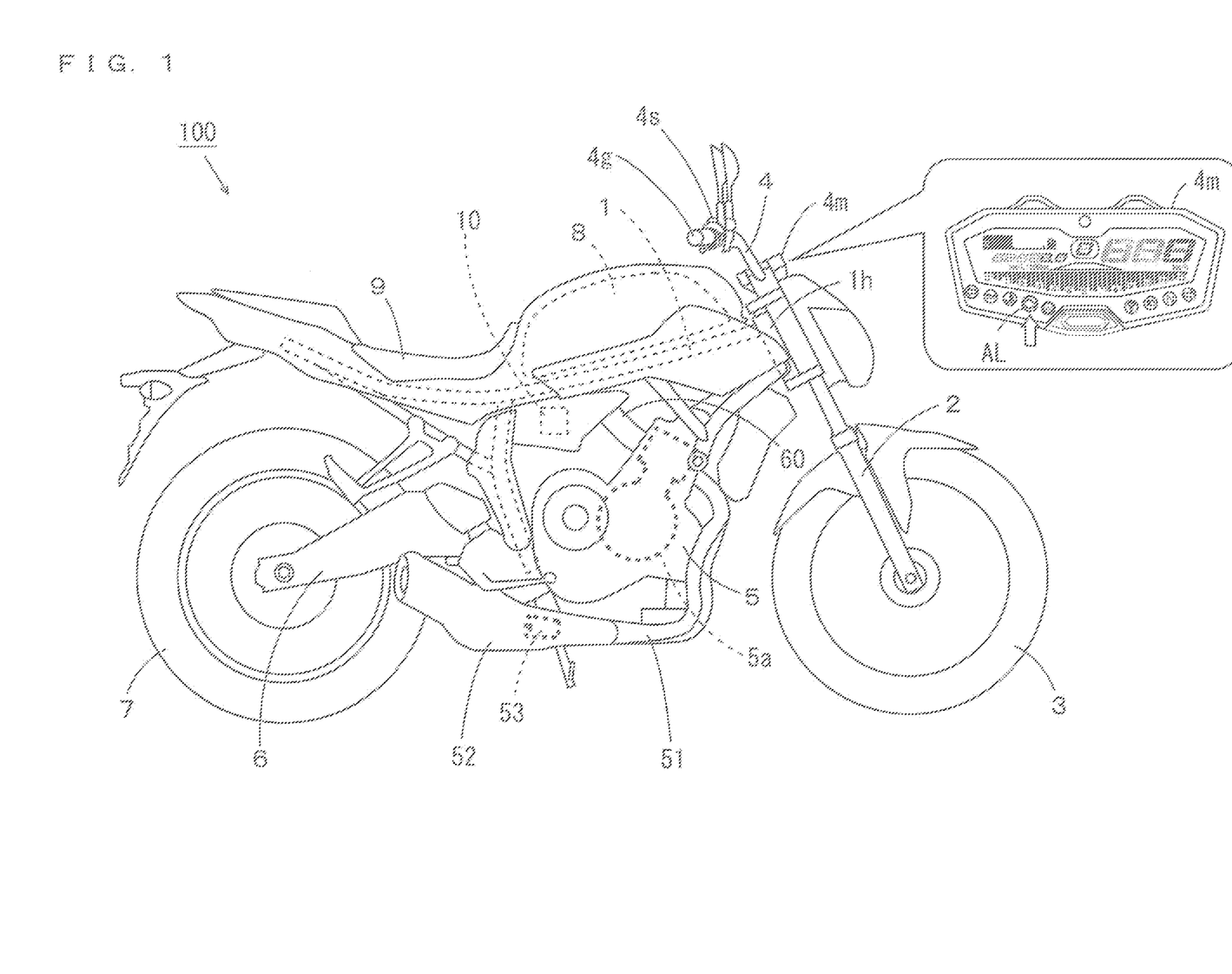
FIG. 1 is a right side view of a motorcycle according to one embodiment of the present invention.

FIG. 1 is a right side view of the motorcycle according to the one embodiment of the present invention. In FIG. 1, the motorcycle 100 standing up to be perpendicular to the road surface is shown. The motorcycle 100 of FIG. 1 includes a metallic body frame 1. The body frame 1 includes a head pipe 1$h$ and a plurality of frame members. The head pipe 1$h$ is located in a front portion of the vehicle, and the plurality of frame members are provided to extend toward a rear portion of the vehicle from the head pipe 1$h$.

A front fork 2 is provided at the head pipe 1$h$ to be swingable in a left-and-right direction. A front wheel 3 is rotatably supported at the lower end of the front fork 2. A handle 4 and a meter unit 4$m$ are provided at the upper end of the front fork 2. An accelerator grip 4$g$ and a cruise control switch unit 4$s$ are provided at the handle 4 to be operable by a rider. The cruise control switch unit 4$s$ is used by the rider to provide an instruction for executing the cruise control or an instruction for ending the cruise control.

As shown in the balloon in FIG. 1, the meter unit 4$m$ has a display (liquid crystal display) that displays a plurality of information pieces such as a speed of vehicle and a remaining amount of fuel. Whether the cruise control is being executed is further displayed in the display. Further, as indicated by the outlined arrow in the balloon of FIG. 1, the meter unit 4$m$ has an alarm light AL for presenting a problem with an engine unit 5 and its accessories to the rider. Problems include degradation of a three-way catalyst 53. Therefore, the alarm light AL according to the present embodiment outputs an alarm in a case where it is determined that the three-way catalyst 53 is degraded in determination in regard to a degradation state of the three-way catalyst 53 by a degradation determiner 15 (FIG. 2), described below. Further, the alarm light AL outputs an alarm when there is a problem with various sensors provided in the engine unit 5 and its accessories, for example.

The body frame 1 supports the engine unit 5, a fuel tank 8 and a seat 9. In this state, the engine unit 5 is located at a position farther downward than the head pipe 1$h$. Further, the fuel tank 8 is located at a position farther upward than the engine unit 5 and farther rearward than the head pipe 1$h$. Further, the seat 9 is located at a position farther rearward than the fuel tank 8.

Figure 2:
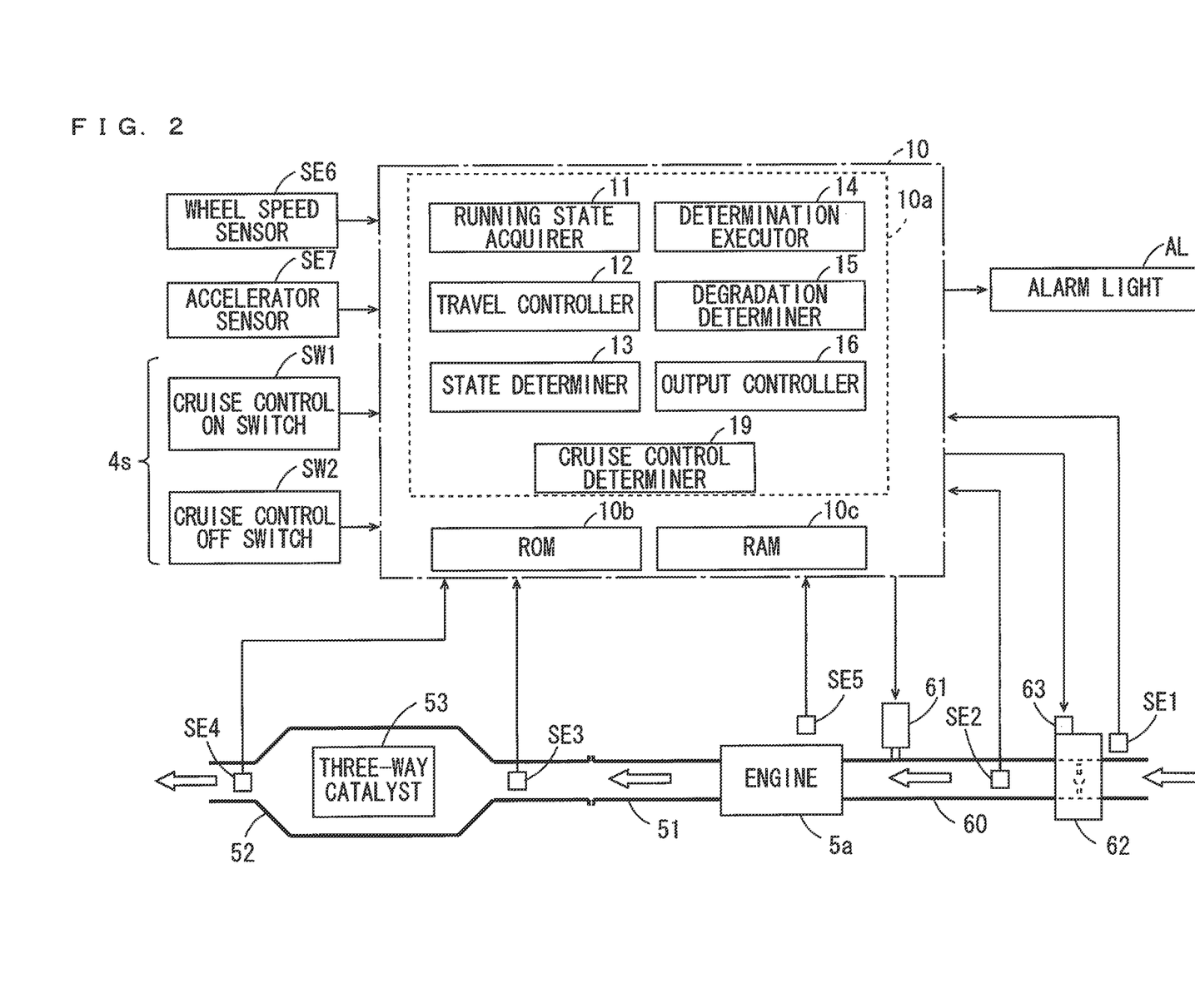
FIG. 2 is a block diagram showing a control system of the motorcycle according to the one embodiment.

The engine unit 5 includes an engine 5$a$. In FIG. 1, the engine 5$a$ is indicated by the thick dotted line. An ECU (Electronic Control Unit) 10 is provided to be surrounded by the engine unit 5, the fuel tank 8 and the seat 9. The ECU 10 includes a CPU (Central Processing Unit) 10$a$ (FIG. 2), a ROM (Read Only Memory) 10$b$ (FIG. 2) and a RAM (Random Access Memory) 10$c$ (FIG. 2).

The ROM 10$b$ is made of a non-volatile memory, for example, and stores a system program, a catalyst degradation determining program and so on. The RAM 10$c$ is made of a volatile memory, for example, which is used as a working area for the CPU 10a, and temporarily stores various data. The CPU 10a executes the catalyst degradation determining program stored in the ROM 10b to implement various functions. Details of various functions implemented by the CPU 10a will be described below. The catalyst degradation determining program in the present embodiment may be provided in the form of being stored in a computer-readable recording medium and may be installed in a storage device connectable to the ROM 10b or the ECU 10. Further, in a case where the ECU 10 is connectable to a communication network, the catalyst degradation determining program delivered from a server connected to the communication network may be installed in the ROM 10b or the storage device with the ECU 10 connected to the communication network.

A rear arm 6 is provided to extend rearwardly from a lower portion at the center of the body frame 1 in a front-and-rear direction of the vehicle. The rear arm 6 is supported at the body frame 1 via a pivot shaft (not shown). A rear wheel 7 is rotatably supported at the rear end of the rear arm 6. The rear wheel 7 is rotated as a drive wheel by motive power generated by the engine unit 5.

The engine 5a has an intake port for supplying an air-fuel mixture into a combustion chamber and an exhaust port for exhausting a combusted gas from the combustion chamber. An intake pipe 60 is connected to the intake port of the engine 5a. A fuel injection device 61 (FIG. 2) and a throttle valve 62 (FIG. 2) are provided at the intake pipe 60. One end of an exhaust pipe 51 is connected to the exhaust port of the engine 5a. A muffler 52 is connected to the other end of the exhaust pipe 51. The three-way catalyst 53 is arranged in the muffler 52. The three-way catalyst 53 cleans an exhaust gas from the engine 5a. The three-way catalyst 53 may be provided in the exhaust pipe 51 instead of the muffler 52.

As described in Background Art, the ability of the three-way catalyst 53 to clean an exhaust gas from the engine 5a is degraded as the period of use becomes longer. As such, in the motorcycle 100 of FIG. 1, catalyst degradation determining work for determining the degradation state of the three-way catalyst 53 is executed. In this catalyst degradation determining work, the air-fuel ratio of an air-fuel mixture supplied to the engine 5a is controlled.

In the motorcycle 100 according to the present embodiment, catalyst degradation determining work is not executed when the cruise control is being executed, in order to prevent control for the catalyst degradation determining work and the cruise control from interfering with each other. Further, in the present embodiment, whether a plurality of running states detected by a plurality of sensors, described below, satisfy a plurality of predetermined allowable conditions is determined. As such, the catalyst degradation determining work is executed in a case where the cruise control is not being executed and a plurality of running states satisfy a plurality of allowable conditions. On the other hand, in a case where a plurality of running states do not satisfy a plurality of allowable conditions, the catalyst degradation determining work is not executed regardless of whether the cruise control is being executed. In the following description, determination of whether a plurality of running states satisfy a plurality of predetermined allowable conditions is referred to as allowable condition determination.

[2] Control System of Motorcycle 100

FIG. 2 is a block diagram showing the control system of the motorcycle 100 according to one embodiment of the present invention. As shown in FIG. 2, the motorcycle 100 according to the present embodiment includes the ECU 10, the fuel injection device 61, a throttle actuator 63, a throttle sensor SE1, an intake pressure sensor SE2, an upstream oxygen sensor SE3, a downstream oxygen sensor SE4 and a crank sensor SE5 as the configuration of the control system. Further, the motorcycle 100 includes a wheel speed sensor SE6, an accelerator sensor SE7, the alarm light AL, a cruise control ON switch SW1 and a cruise control OFF switch SW2.

The cruise control ON switch SW1 and the cruise control OFF switch SW2 constitute a cruise control switch unit 4s of FIG. 1. In the present embodiment, the configuration including the ECU 10 and the cruise control switch unit 4s is equivalent to the catalyst degradation determining device of the present invention.

The throttle actuator 63 adjusts an opening of the throttle valve 62, thereby adjusting the flow rate of air guided from an air cleaner (not shown) to the engine 5a. The fuel injection device 61 injects fuel into the intake port of the engine 5a such that an air-fuel mixture is guided to the combustion chamber of the engine 5a.

The throttle sensor SE1 is provided in the vicinity of the throttle valve 62. The throttle sensor SE1 detects an opening (throttle opening) of the throttle valve 62 and outputs an electrical signal indicating the detected throttle opening. The intake pressure sensor SE2 is provided at a portion farther downstream than the throttle valve 62 in the intake pipe 60. The intake pressure sensor SE2 detects a pressure (intake pressure) in the intake pipe 60 as an intake state of the engine 5a and outputs an electrical signal indicating the detected intake pressure.

The upstream oxygen sensor SE3 is provided at a portion farther upstream than the three-way catalyst 53 in the muffler 52. The upstream oxygen sensor SE3 detects an oxygen concentration of an exhaust gas which has been exhausted from the engine 5a and has yet been cleaned by the three-way catalyst 53 and outputs an electrical signal indicating the detected oxygen concentration. The upstream oxygen sensor SE3 may be provided in the exhaust pipe 51 instead of the muffler 52.

The downstream oxygen sensor SE4 is provided at a portion farther downstream than the three-way catalyst 53 in the muffler 52. The downstream oxygen sensor SE4 detects an oxygen concentration of an exhaust gas that has been exhausted from the engine 5a and has been cleaned by the three-way catalyst 53 and outputs an electrical signal indicating the detected oxygen concentration.

As described above, the three-way catalyst 53 may be provided in the exhaust pipe 51 instead of the muffler 52. Therefore, in a case where the three-way catalyst 53 is provided in the exhaust pipe 51, the upstream oxygen sensor SE3 and the downstream oxygen sensor SE4 may be provided in the exhaust pipe 51 to be respectively located at a portion farther upstream than the three-way catalyst 53 and a portion farther downstream than the three-way catalyst 53.

The crank sensor SE5 is provided in the vicinity of the engine 5a. The crank sensor SE5 detects a rotation speed (engine rotation speed) of the crankshaft of the engine 5a and outputs an electrical signal indicating the detected engine rotation speed. The wheel speed sensor SE6 is provided in the vicinity of the lower end of the front fork 2 of FIG. 1. The wheel speed sensor SE6 detects a rotation speed of the front wheel 3 of FIG. 1 and outputs an electrical signal indicating the detected rotation speed. The wheel speed sensor SE6 may be provided in the vicinity of the rear end of the rear arm 6 of FIG. 1. In this case, the wheel speed sensor SE6 detects a rotation speed of the rear wheel 7 of FIG. 1 and outputs an electrical signal indicating the detected rotation speed.

The accelerator sensor SE7 is provided at the handle 4 of FIG. 1. The accelerator sensor SE7 detects an operation amount (accelerator opening) of the accelerator grip 4g by the rider and outputs an electrical signal indicating the detected accelerator opening.

The cruise control ON switch SW1 outputs an electric signal for providing an instruction for starting execution of the cruise control by a rider's operation. The cruise control OFF switch SW2 outputs an electrical signal for providing an instruction for ending execution of the cruise control by a rider's operation.

The ECU 10 includes the CPU 10a, the ROM 10b and the RAM 10c, and the CPU 10a includes a running state acquirer 11, a travel controller 12, a state determiner 13, a determination executor 14, a degradation determiner 15, an output controller 16 and a cruise control determiner 19 as functions. These functions of the CPU 10a are implemented by execution of the catalyst degradation determining program stored in the ROM 10b by the CPU 10a. Part or all of the plurality of functions of the ECU 10 may be implemented by hardware such as an electronic circuit.

The running state acquirer 11 acquires a throttle opening by receiving the output of the throttle sensor SE1. Further, the running state acquirer 11 receives the output of the intake pressure sensor SE2. Thus, the running state acquirer 11 calculates an amount (intake amount) of air guided to the combustion chamber per cycle of the engine 5a based on the received intake pressure and acquires the calculated intake amount as a running state. Further, by receiving the output of the upstream oxygen sensor SE3, the running state acquirer 11 acquires an oxygen concentration of an exhaust gas that has yet been cleaned by the three-way catalyst 53. Further, by receiving the output of the downstream oxygen sensor SE4, the running state acquirer 11 acquires an oxygen concentration of an exhaust gas that has been cleaned by the three-way catalyst 53.

Further, the running state acquirer 11 acquires an engine rotation speed as a running state by receiving the output of the crank sensor SE5. Further, the running state acquirer 11 receives the output of the wheel speed sensor SE6. Thus, the running state acquirer 11 calculates a moving speed (traveling speed) of the motorcycle 100 based on a rotation speed of the front wheel 3 (or the rear wheel 7) and acquires the calculated traveling speed as a running state. Further, the running state acquirer 11 acquires an accelerator opening by receiving the output of the accelerator sensor SE7.

The running state acquirer 11 may calculate the above-mentioned intake amount based on a map representing the predetermined relationship among a throttle opening, an engine rotation speed and an intake amount, and an actually acquired throttle opening and an actually acquired engine rotation speed.

Throttle control information and target air-fuel ratio information are stored in the ROM 10b of the ECU 10 in advance. Throttle control information includes information representing the predetermined relationship among an engine rotation speed, a throttle opening and an accelerator opening. Target air-fuel ratio information includes information representing the predetermined relationship among an engine rotation speed, a throttle opening and a target air-fuel ratio.

The travel controller 12 controls the work of the throttle actuator 63 based on throttle control information, and an engine rotation speed, a throttle opening and an accelerator opening acquired by the running state acquirer 11, with the cruise control not executed and the catalyst degradation determining work not executed. Further, the travel controller 12 controls a fuel injection point in time and a fuel injection period of time in the fuel injection device 61 based on target air-fuel ratio information, and an engine rotation speed acquired and a throttle opening acquired by the running state acquirer 11, with the catalyst degradation determining work not executed. In this manner, an opening of the throttle valve 62 is adjusted, and feedback control for bringing the air-fuel ratio of an air-fuel mixture close to a target air-fuel ratio is executed. Thus, the travel state of the motorcycle 100 is adjusted in accordance with an operation of the accelerator grip 5g by the rider.

Further, in a case where an instruction for starting the cruise control is output from the cruise control ON switch SW1 during traveling of the vehicle, the travel controller 12 starts execution of the cruise control in response to the start instruction. During execution of the cruise control, the travel controller 12 controls the work of the throttle actuator 63 based on an acquired traveling speed and an acquired throttle opening such that a traveling speed at the time of acquisition of the start instruction is kept. Further, in a case where an instruction for ending the cruise control is output from the cruise control OFF switch SW2 during execution of the cruise control, the travel controller 12 ends execution of the cruise control in response to the end instruction.

The cruise control determiner 19 receives a start instruction output from the cruise control ON switch SW1 and an end instruction output from the cruise control OFF switch SW2. Further, the cruise control determiner 19 determines whether the cruise control is being executed based on whether an instruction for starting the cruise control or an instruction for ending the cruise control has been received.

In the motorcycle 100 according to the present embodiment, an allowable region representing the allowable relationship between an intake amount of the engine 5a and an engine rotation speed is defined as the information for allowing execution of the catalyst degradation determining work. In the ROM 10b of the ECU 10 (FIG. 2), the information representing this allowable region is stored in advance as an intake amount-engine rotation speed table.

Figure 3:
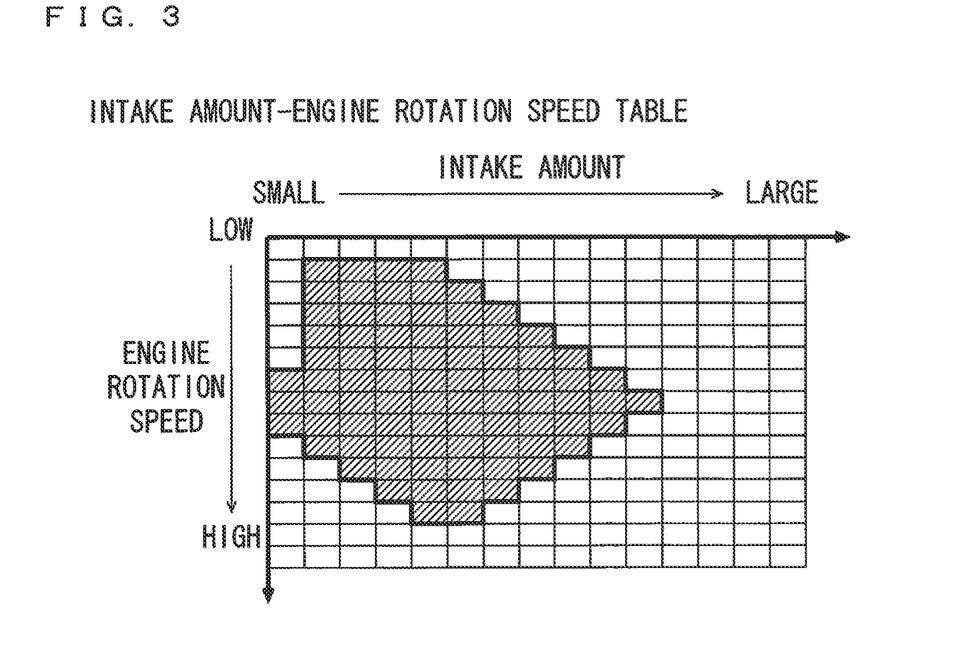
FIG. 3 is a diagram showing one example of an intake amount-engine rotation speed table according to the one embodiment.

FIG. 3 is a diagram showing one example of the intake amount-engine rotation speed table according to one embodiment of the present invention. In the intake amount-engine rotation speed table of FIG. 3, the ordinate indicates an engine rotation speed, and the abscissa indicates an intake amount. Further, the hatched region is the allowable region representing the allowable relationship between an intake amount of the engine 5a and an engine rotation speed.

In the allowable region of FIG. 3, the engine rotation speed is limited to an intermediate speed in the entire range of the engine rotation speed as an intake amount increases. Further, the allowable region of FIG. 3 is set such that an intake amount is limited to an amount slightly smaller than an intermediate amount in the entire range of the intake amount as the engine rotation speed increases. An allowable region is defined for each type of the motorcycle 100 by an experiment, simulation or the like such that certain credibility is kept in regard to a result of determination as to the degradation state of the three-way catalyst 53 by the catalyst degradation determining work.

The state determiner 13 of FIG. 2 carries out the allowable condition determination. Specifically, the state determiner 13 determines whether a plurality of running states in regard to the motorcycle 100 satisfy a plurality of predetermined allowable conditions. The plurality of allowable conditions include that the relationship between an intake amount of the engine 5*a* and an engine rotation speed is in an allowable region.

As such, the state determiner 13 determines whether the relationship between an intake amount of the engine 5*a* and an engine rotation speed is in an allowable region based on the intake amount-engine rotation speed table.

Further, the plurality of allowable conditions further include that the engine 5*a* has started, the engine 5*a* has been working continuously for a predetermined period of time, a rotation speed of the engine 5*a* does not exceed a predetermined upper limit speed and an intake amount of the engine 5*a* is in a certain range, for example.

The determination executor 14 executes the catalyst degradation determining work in a case where the cruise control is not being executed and the state determiner 13 determines that a plurality of running states satisfy all of the allowable conditions. On the other hand, the determination executor 14 does not execute the catalyst degradation determining work in a case where the cruise control is being executed or the state determiner 13 determines that a plurality of running states do not satisfy at least part of the allowable conditions.

During the traveling of the motorcycle 100, feedback control for the air-fuel ratio of an air-fuel mixture is basically executed based on the control of the travel controller 12. Thus, the air-fuel ratio of an air-fuel mixture changes between rich and lean with a target air-fuel ratio as a basis. Here, the catalyst degradation determining work includes forcibly increasing a change period and a change range of the air-fuel ratio of an air-fuel mixture caused by the feedback control as compared to a case where the catalyst degradation determining work is not executed. A change period and a change range of the air-fuel ratio of an air-fuel mixture are adjusted by a change of a fuel injection point in time, a fuel injection period of time, etc. in the fuel injection device 61 by the determination executor 14.

The running state acquirer 11 acquires oxygen concentrations that are continuously output from the upstream oxygen sensor SE3 and the downstream oxygen sensor SE4 in a predetermined period during the catalyst degradation determining work. The degradation determiner 15 determines whether the three-way catalyst 53 is degraded based on changes of oxygen concentrations that are output from the upstream oxygen sensor SE3 and the downstream oxygen sensor SE4 during the catalyst degradation determining work and acquired by the running state acquirer 11.

As in the example described in Background Art, a degradation state may be determined by calculation of the ratio of an inversion frequency of output of the downstream oxygen sensor SE4 with respect to an inversion frequency of output of the upstream oxygen sensor SE3 and use of the calculated ratio of inversion frequency. An inversion frequency is the number of times an output voltage of each oxygen sensor (SE3, SE4) crosses a predetermined threshold value in a predetermined period of time. Alternatively, a degradation state may be determined by calculation of the matching degree of two output waveforms by comparison between an output waveform of the upstream oxygen sensor SE3 and an output waveform of the downstream oxygen sensor SE4 and use of the calculated matching degree. Further alternatively, a degradation state may be determined by calculation of a response delay period of time between the work of the fuel injection device 61 and a change in oxygen concentration of an exhaust gas and use of the calculated response delay period of time.

The output controller 16 outputs an alarm in a case where the degradation determiner 15 determines that the three-way catalyst 53 is degraded and a case where the problem determining device (not shown) determines that there is a problem with accessories such as various sensors. Specifically, the output controller 16 controls the alarm light AL of FIG. 1 such that the alarm light AL lights up or blinks in one predetermined luminescent color (red or the like), for example.

On the other hand, the output controller 16 does not output an alarm in a case where it is not determined that the three-way catalyst 53 is degraded and a case where the problem determining device (not shown) does not determine that there is a problem with accessories such as various sensors. Specifically, the output controller 16 controls the alarm light AL of FIG. 1 such that the alarm light AL lights up in another luminescent color (yellow, green or the like) or is turned off.

As described above, the alarm light AL outputs a common alarm in regard to a plurality of problem types. Therefore, even though recognizing the output of a common alarm, the rider or an operator who maintains the motorcycle 100 cannot identify what problem is present with the motorcycle 100. As such, the ECU 10 according to the present embodiment has a self-diagnosis function (so-called on-board diagnosis) for specifying the type of a problem with the motorcycle 100.

With this self-diagnosis function, a dedicated diagnosis tool is connected to a diagnosis port provided in a vehicle body when an alarm is output by the alarm light AL, so that the type of a currently present problem is specified. Further, the specified problem type is output from the diagnosis tool. Thus, the rider or the operator can identify the type of a currently present problem with use of the dedicated diagnosis tool in a case where an alarm is output from the alarm light AL.

Instead of the above-mentioned example of the self-diagnosis function, the ECU 10 may have a function for further presenting the problem type corresponding to an output alarm (a problem confirming function) when an alarm is output by the alarm light AL.

For example, in regard to a plurality of problems types corresponding to alarms output by the alarm light AL, luminescent colors and lighting patterns of the alarm light AL may be defined respectively. In this case, in a case where an instruction for executing the problem confirming function is provided, the output controller 16 causes the alarm light AL to light up in a predetermined luminescent color and a predetermined lighting pattern in regard to a problem type corresponding to an output alarm. Thus, the rider or the operator can easily identify a problem type by viewing a luminescent state of the alarm light AL.

Alternatively, when an instruction for executing the problem confirming function is provided, the output controller 16 may display a message such as an error code indicating the problem type corresponding to an output alarm in the display of the meter unit 4*m*. Thus, the rider or the operator can easily identify a problem type based on a message displayed in the display of the meter unit 4*m*.

Therefore, the rider or the operator who maintains the motorcycle 100 can easily identify a degradation state of the three-way catalyst 53 by using the problem confirming function.

In the meter unit 4*m* according to the present embodiment, another alarm light that lights up only in a case where it is determined that the three-way catalyst 53 is degraded may be provided in addition to the above-mentioned alarm light AL. Alternatively, the above-mentioned alarm light AL may be driven in a specific luminescent color and in a specific lighting pattern only in a case where it is determined that the three-way catalyst 53 is degraded. Further alternatively, in the display (crystal display) of the meter unit 4m, when an alarm is output by the alarm light AL, a message indicating a problem type corresponding to the output alarm may be displayed. In these cases, even in a case where the ECU 10 does not have the problem confirming function, the rider or the operator can easily identify a degradation state of the three-way catalyst 53.

[3] Catalyst Degradation Determining Process

Figure 4:
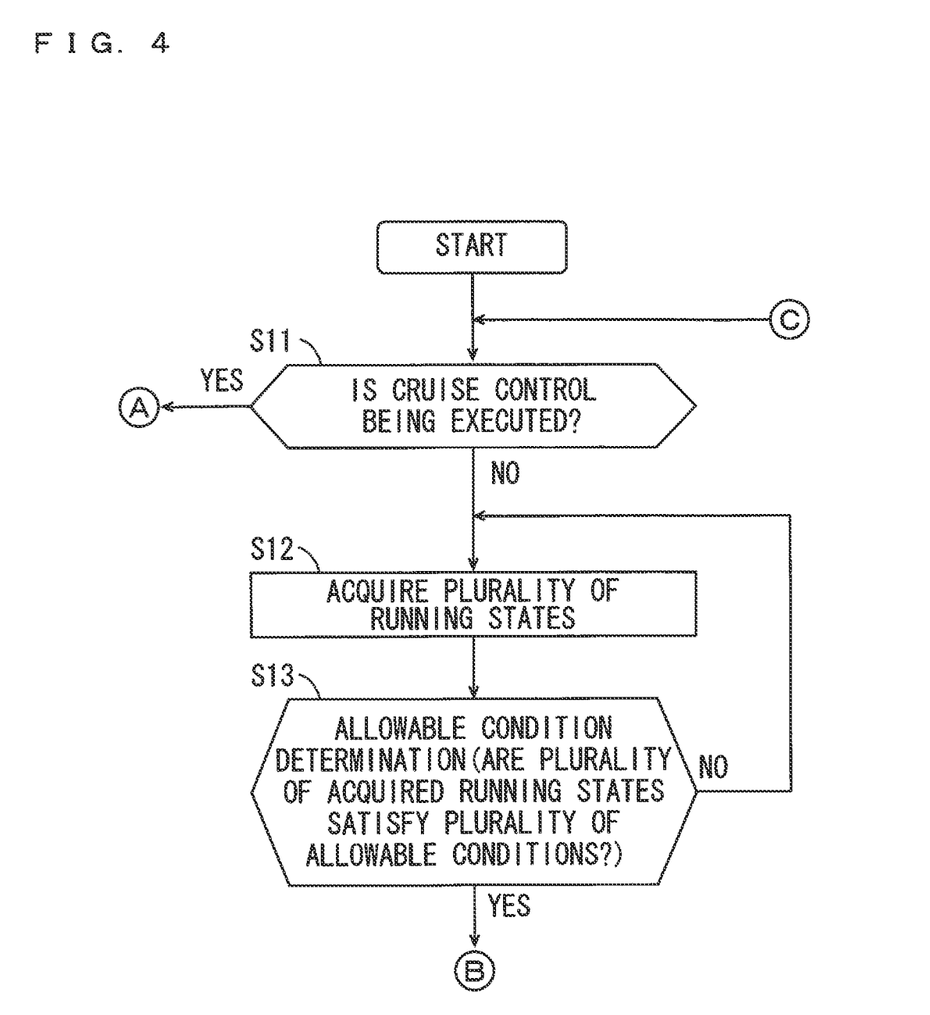
FIG. 4 is a flowchart of a catalyst degradation determining process according to the one embodiment.
Figure 5:
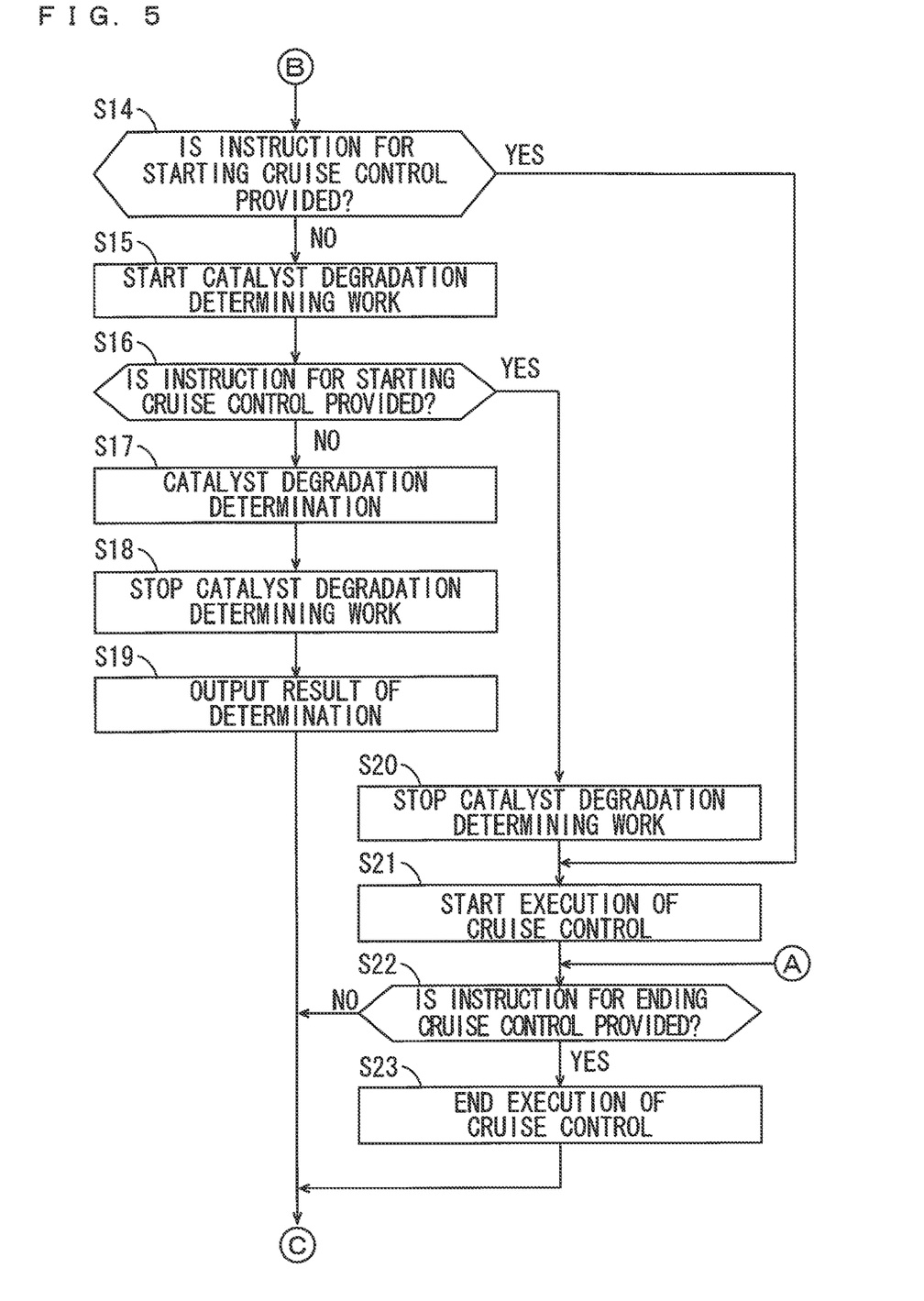
FIG. 5 is a flowchart of the catalyst degradation determining process according to the one embodiment.

FIG. 4 and FIG. 5 are flowcharts of a catalyst degradation determining process according to one embodiment of the present invention. The catalyst degradation determining process is started when the CPU 10a of the ECU 10 executes the catalyst degradation determining program in response to power-on of the motorcycle 100 or start-up of the engine 5a.

When the catalyst degradation determining process is started, the cruise control determiner 19 determines whether the cruise control is being executed (step S11). In a case where the cruise control is being executed, the cruise control determiner 19 causes the process to proceed to the step S22, described below. On the other hand, in a case where the cruise control is not being executed, the running state acquirer 11 acquires a plurality of running states based on the output from various sensors (SE1 to SE7) (step S12). The plurality of acquired running states include a throttle opening, an intake amount of the engine 5a, an oxygen concentration of an exhaust gas that has yet been cleaned by the three-way catalyst 53 and an oxygen concentration of an exhaust gas that has been cleaned by the three-way catalyst 53. Further, the plurality of acquired running states include an engine rotation speed, a traveling speed of the motorcycle 100 and an accelerator opening.

Next, the state determiner 13 carries out the allowable condition determination (step S13). That is, the state determiner 13 determines whether the plurality of running states acquired in the step S12 satisfy a plurality of predetermined allowable conditions. This allowable condition determination includes determination of whether the relationship between an acquired intake amount of the engine 5a and an acquired engine rotation speed is in an allowable region based on the intake amount-engine rotation speed table of FIG. 4.

In a case where the plurality of running states do not satisfy the plurality of allowable conditions, the state determiner 13 causes the process to return to the step S12. Thus, a plurality of running states are acquired again. On the other hand, in a case where the plurality of running states satisfy the plurality of allowable conditions, the cruise control determiner 19 determines whether an instruction for starting the cruise control has been received from the cruise control ON switch SW1 (step S14).

In the step S14, in a case where an instruction for starting the cruise control has been received, the cruise control determiner 19 causes the process to proceed to the step S21, described below. On the other hand, in a case where an instruction for starting the cruise control has not been received, the determination executor 14 starts the catalyst degradation determining work (step S15).

Next, the cruise control determiner 19 determines again whether an instruction for starting the cruise control has been received from the cruise control ON switch SW1 (step S16). In a case where the cruise control determiner 19 has not received a start instruction in the step S16, the degradation determiner 15 determines whether the three-way catalyst 53 is degraded based on changes of oxygen concentrations output from the upstream oxygen sensor SE3 and the downstream oxygen sensor SE4 (step S17). When determination completes, the determination executor 14 stops the catalyst degradation determining work (step S18).

Thereafter, the output controller 16 outputs a result of determination in regard to a degradation state of the three-way catalyst 53 by controlling the alarm light AL of FIG. 1 (step S19) and causes the process to return to the step S11.

In a case where the cruise control determiner 19 receives a start instruction in the above-mentioned step S16, the determination executor 14 stops the catalyst degradation determining work (step S20). Further, the travel controller 12 starts execution of the cruise control (step S21). Thereafter, the cruise control determiner 19 determines whether an instruction for ending the cruise control has been received (step S22).

In the step S22, in a case where the cruise control determiner 19 receives an end instruction, the travel controller 12 ends execution of the cruise control (step S23) and causes the process to return to the step S11. On the other hand, in the step S22, in a case where the cruise control determiner 19 has not received an instruction for ending the cruise control, the cruise control determiner 19 causes the process to return to the step S11.

In the motorcycle 100 according to the present embodiment, as the configuration for outputting a result of determination in regard to a degradation state of the three-way catalyst 53, a speech output device that outputs a result of determination in regard to a degradation state by speech may be provided in addition to the alarm light AL. In this case, the output controller 16 may generate an alarm sound for presenting degradation of the three-way catalyst 53 by controlling the speech output device in a case where it is determined that the three-way catalyst 53 is degraded.

Further, in the above-mentioned catalyst degradation determining process, the step S11 may be executed after the step S12 and before the step S13, or may be executed after the steps S12 and S13.

[4] Effects of Embodiments (1) Generally, a power-to-weight ratio of a straddled vehicle such as a motorcycle is smaller than a power-to-weight ratio of an automobile (Automobile Car). Thus, in regard to a straddled vehicle, a change in torque generated in an engine is more likely to influence work of the vehicle as compared to an automobile. Therefore, in a straddled vehicle, a traveling speed changes subtly in response to a change of an air-fuel ratio during the above-mentioned catalyst degradation determining work, for example.

During traveling of a straddled vehicle in which the cruise control has been executed, an opening of a throttle valve is adjusted such that a traveling speed is constant and a predetermined speed. However, in a case where the catalyst degradation determining work is executed during execution of the cruise control, it is difficult to cancel a change of a traveling speed in accordance with a change of an air-fuel ratio by adjustment of an opening of the throttle valve. The reasons for this include that it is difficult to synchronize the control period of the cruise control with the control period of the catalyst degradation determining work, and that a response delay is generated from the time when an opening of the throttle valve is adjusted until a traveling speed changes. Thus, when the catalyst degradation determining work is executed during execution of the cruise control, the rider is highly likely to feel uncomfortable with respect to the work of the straddled vehicle.

In contrast, in the motorcycle 100 according to the present embodiment, in a case where the cruise control is being executed, the catalyst degradation determining work is not executed. Thus, with the cruise control executed, a torque of the engine 5a does not change because of the control of an air-fuel mixture supplied to the engine 5a. As a result, riding comfort in the motorcycle 100 is prevented from being degraded when the cruise control is being executed.

(2) The cruise control determiner 19 determines whether the cruise control is being executed not based on a change of an oxygen concentration of an exhaust gas but based on whether an instruction for starting the cruise control has been received and whether an instruction for ending the cruise control has been received. Thus, the catalyst degradation determining work is reliably prevented from being executed when the cruise control is being executed.

[5] Other Embodiments (1) The throttle actuator 63 is controlled such that a traveling speed is kept at the traveling speed at the time of acquisition of an instruction for starting the cruise control during execution of the cruise control. However, the present invention is not limited to this. A traveling speed to be kept during execution the cruise control may be defined based on a traveling speed input by a rider's operation of an input device (not shown), for example.

(2) While the cruise control ends when an end instruction is provided by an operation of the cruise control OFF switch SW2 during execution of the cruise control in the above-mentioned embodiment, the present invention is not limited to this.

The cruise control may end by not only an end instruction provided by an operation of the cruise control OFF switch SW2 but also satisfaction of a predetermined condition for ending the cruise control. A condition for ending the cruise control may be a brake operation performed by the rider after execution of the cruise control is started or an elapse of a predetermined period of time after execution of the cruise control is started, for example.

(3) While a plurality of allowable conditions for allowing execution of the catalyst degradation determining work is defined in regard to a plurality of running states in the motorcycle 100 according to the above-mentioned embodiment, the present invention is not limited to this. In the above-mentioned motorcycle 100, only one allowable condition may be defined, or an allowable condition does not have to be defined. In the motorcycle 100 for which an allowable condition is not defined, the catalyst degradation determining work is executed regardless of a plurality of running states when the cruise control is not being executed.

(4) While the cruise control is the control for keeping a traveling speed constant during traveling of a vehicle in the above-mentioned embodiment, the present invention is not limited to this. The cruise control may include the control for keeping a certain distance from a leading vehicle in a case where the leading vehicle is present in a predetermined range forward of the traveling motorcycle 100 in addition to the control for keeping a traveling speed of the motorcycle 100 constant.

(5) While the running state acquirer 11 according to the above-mentioned embodiment acquires a plurality of running states by receiving the output from various sensors (SE1 to SE7), the present invention is not limited to this. The running state acquirer 11 may acquire one or a plurality of information pieces input by a rider's operation of an input device or the like, for example, as one or a plurality of running information pieces instead of output signals from various sensors (SE1 to SE7).

(6) While the three-way catalyst 53 is used as the configuration for cleaning an exhaust gas in the above-mentioned embodiment, the present invention is not limited to this. The three-way catalyst 53 may be replaced with an oxidation catalyst or a reduction catalyst, for example.

(7) While the above-mentioned embodiment is an example in which the present invention is applied to a motorcycle, the present invention is not limited to this. The present invention may be applied to another straddled vehicle such as a four-wheeled automobile, a motor tricycle or an ATV (All Terrain Vehicle).

[6] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the cruise control determiner 19 of the ECU 10 is an example of a determiner, the state determiner 13 and the determination executor 14 of the ECU 10 are examples of an execution controller, and the configuration including the cruise control switch unit 4s and the ECU 10 is an example of a catalyst degradation determining device.

Further, the engine 5a is an example of an engine, the intake pipe 60, the fuel injection device 61, the throttle valve 62 and the throttle actuator 63 are examples of an air-fuel mixture supplier, the three-way catalyst 53 is an example of a catalyst, and the travel controller 12 is an example of a cruise control executor.

As each of constituent elements recited in the claims, various other elements having configurations or functions described in the claims can be also used.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A catalyst degradation determining device for a straddled vehicle that includes
an engine,
a catalyst for cleaning an exhaust gas from the engine, and
a throttle valve that is controllable by cruise control of the straddled vehicle to keep a traveling speed of the straddled vehicle constant,
the catalyst degradation determining device comprising:
a determiner that determines whether the cruise control is being executed; and
an execution controller that is configured
to determine a degradation state of the catalyst while controlling an air-fuel mixture supplied through the throttle valve to the engine, in a case where the determiner determines that the cruise control is not being executed, and at least one running state of the straddled vehicle satisfies at least one predetermined allowable condition, and
not to determine the degradation state of the catalyst in a case where the determiner determines that the cruise control is being executed.

2. The catalyst degradation determining device for a straddled vehicle, according to claim 1, wherein
the determiner determines that the execution of the cruise control has started based on an instruction for executing the cruise control, and determines that the execution of the cruise control has ended based on an instruction for ending the cruise control.

3. A straddled vehicle comprising:
an engine;
an air-fuel mixture supplier that supplies an air-fuel mixture to the engine;
a catalyst that cleans an exhaust gas from the engine;
a cruise control executor that executes cruise control for keeping a traveling speed of the straddled vehicle constant during traveling of the straddled vehicle by controlling the air-fuel mixture supplier; and
the catalyst degradation determining device according to claim 1.

\* \* \* \* \*